United States Patent [19]
Miller

[11] 3,844,249
[45] Oct. 29, 1974

[54] TRACER TYPE STRIPE PRINTING SYSTEM
[75] Inventor: Vincent P. Miller, Wilkins Township, Allegheny County, Pa.
[73] Assignee: Miller Pottery Engineering Company, Swissvale, Pa.
[22] Filed: Mar. 17, 1972
[21] Appl. No.: 235,526

[52] U.S. Cl................ 118/2, 118/242, 118/252
[51] Int. Cl............................................ B05c 11/00
[58] Field of Search.......... 118/216, 219, 221, 222, 118/225, 226, 239, 240, 241, 242, 236, 247, 1, 2, 6, 7, 8, 259, 3; 117/43; 101/35

[56] References Cited
UNITED STATES PATENTS

| | | | |
|---|---|---|---|
| 2,159,674 | 5/1939 | Petersen | 91/50 |
| 2,557,696 | 6/1951 | Schaefer | 91/50 |
| 2,647,489 | 8/1953 | Ryckman | 118/219 |
| 2,690,156 | 9/1954 | Shields | 118/11 |
| 2,754,795 | 7/1956 | Enssle | 118/2 |
| 2,900,952 | 8/1959 | Perry | 118/207 |
| 2,952,204 | 9/1960 | Sherman | 101/35 |
| 3,244,139 | 4/1966 | Brown et al. | 118/11 |
| 3,362,323 | 1/1968 | Wada et al. | 101/2 |
| 3,425,393 | 2/1969 | Shuh et al. | 118/2 |
| 3,438,354 | 4/1969 | Luescher | 118/76 |
| 3,609,029 | 9/1971 | Egnaczak | 355/3 |
| 3,688,690 | 9/1972 | Gabbrielli | 101/35 |
| 3,719,167 | 3/1973 | Pahlitzsch | 118/211 |
| 3,731,648 | 5/1973 | Gerber et al. | 118/6 |

Primary Examiner—W. C. Reynolds
Assistant Examiner—Leo Millstein
Attorney, Agent, or Firm—Wm. Henry Venable

[57] ABSTRACT

My invention relates to the apparatus for printing stripe patterns on work blanks passing over a work conveyor, particularly on glass or ceramic work pieces on which the stripes as printed are films of metallic solutions, prior to firing or furnace treatment of the work pieces for glazing or shape forming of the product. The system disclosed involves conveying the work pieces in succession from a loading station to a work station where the work piece is positioned into a precise predetermined position, then passing one or more stripe printing rollers guided by templates over the work to print a predetermined pattern, and finally removing the work piece to an unloading station (or to the furnace directly), the conveyor and the printing mechanism being started and stopped automatically to print the pattern on each work piece as loaded on the conveyor in the shortest possible time.

7 Claims, 17 Drawing Figures

TRACER TYPE STRIPE PRINTING SYSTEM

SUMMARY OF THE INVENTION

The apparatus structure of my invention is comprised at least of a printing mechanism including a printing head vertically and horizontally deflectable, mounted to traverse a work printing station, and templates to guide both the vertical and horizontal deflection of the printing head as the mechanism traverses said printing station, thus to lower the printing head into printing contact with the upper surface of flat objects at said printing station and guide it to reproduce a stripe of a pattern on said surface. Preferably the printing station is a section of a material handling structure adapted to deliver flat objects to, and remove them from, said printing station in succession, the structure not being in operation while the printing operation is performed. In the combination including both such a material handling structure and printing mechanism, means are also provided to stop the material handling operation when a blank flat object arrives in properly indexed position at the printing station, and then initiate traverse of the printing mechanism back and forth across the work object. Such combination may include two printing mechanisms traversing the work station at right angles to print both generally longitudinal and generally transverse stripe patterns on the surface of the object. When two printing mechanisms are provided, the system preferably includes automatic controls synchronizing their travel to avoid mechanical interference where the longitudinal and transverse patterns cross or are close together, and providing the shortest time for printing both patterns without such interference.

My combination of a material handling mechanism and printing mechanism includes means to signal arrival of work pieces at the printing station in properly indexed position with respect to the templates, said signal functioning to stop the material handling operation. The combination also includes means preventing operating the material handling means until completion of the stripe printing operation.

DETAILED DESCRIPTION

Figure 1:
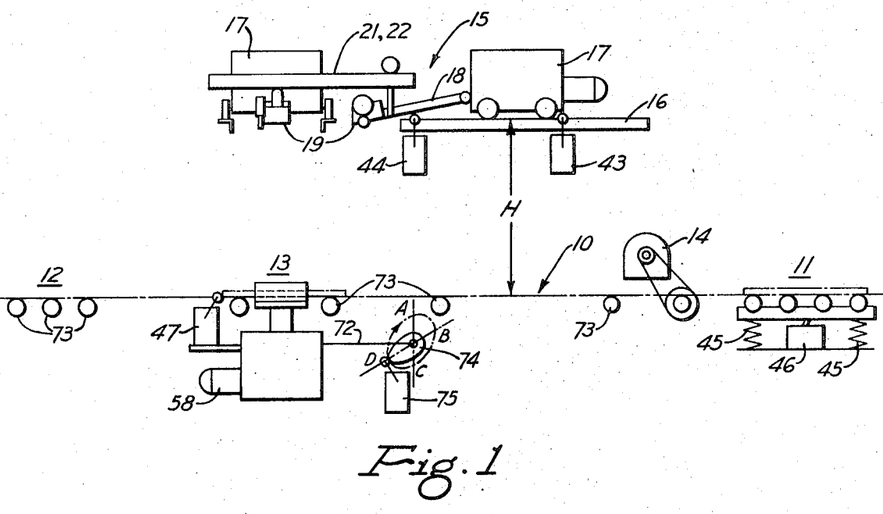
FIG. 1 is a diagrammatic elevational view of one embodiment of my invention.
Figures 3, 4:
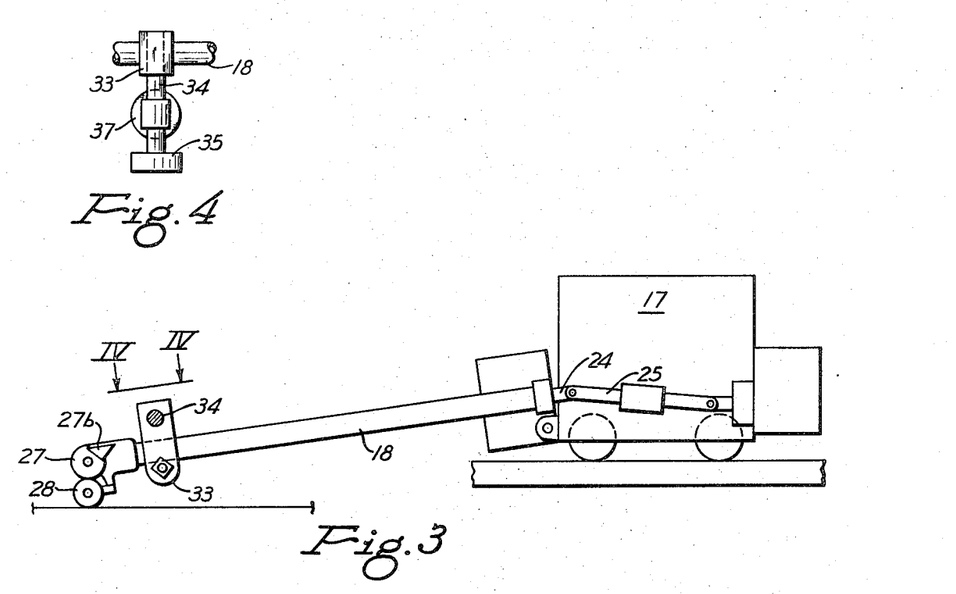
FIG. 3 is a schematic illustration of a carriage and stripe printing arm and FIG. 4 is a plan view at the plane IV—IV of FIG. 3.

The system of my invention of which the following detailed description discloses one embodiment, consists of an apparatus for printing stripes on substantially flat work pieces in sequence and the combination of apparatus components illustrated in the accompanying drawings, the general arrangement of which is schematically shown in FIG. 1. This apparatus includes a work carrying conveyor 10, having a loading station 11 at one end, an unloading station 12 at the opposite end, and a stripe printing station 13 intermediate these ends. This conveyor may be of any conventional type for carrying substantially flat work pieces. The conveyor 10 illustrated in the drawings is a roller type in which all of the rollers are driven in synchronism by a motor operated drive 14. One or more stripe printing mechanisms 15 (two being shown in the illustrations) are mounted above the conveyor 10 on tracks 16. Each printing mechanism 15 is comprised of a carriage 17 on the tracks 16, from which extends a stripe printing arm 18 at the end of which is a pigment applying head 19. The height H of the tracks 16 above the conveyor 10 is greatly exaggerated in the diagram of FIG. 1, in which the conveyor and carriage tracks are separated for greater clarity of the general arrangement; the actual distance being correctly shown in FIG. 3. The stripe printing arm 18 connects to the carriage 17 through a universal hinged joint 20 permitting the arm 18 to deflect angularly both vertically and horizontally. The vertical deflection thus provided is sufficient for the printing head 19 to be lowered into contact with work on the conveyor 10 at stripe printing station 13 and the horizontal deflection allows the printing head to follow the desired stripe pattern to be printed. As will be explained subsequently, this deflection of the arm 18 is steered by templates 21, 22 above the stripe printing station 13. The carriage tracks 16 and templates may be mounted on a structural supporting frame 23.

The angularly deflectable arm 18 with a stripe printing head 19 at the end, as shown in FIGS. 1 through 4 and 5, is not in itself new; the basic construction being disclosed in Ryckman U.S. Pat. No. 2,647,489. The arm 18 is the casing for a drive shaft 24 connected at the hinge 20 to a universal spindle 25 in the carriage 16, driven by a driving gear 26 of conventional construction indicated only by a rectangle on FIG. 3. These are similar to the tubular arm 9, shaft 17, and spindle 18 in the Ryckman patent referred to above, the only difference being that Ryckman's rocker 8 is hinged only to swing vertically instead of the universal hinge 20. If straight line stripes only are desired, hinge 20 may be vertical only instead of universal and the horizontal templates 21 may be omitted.

Figure 5:
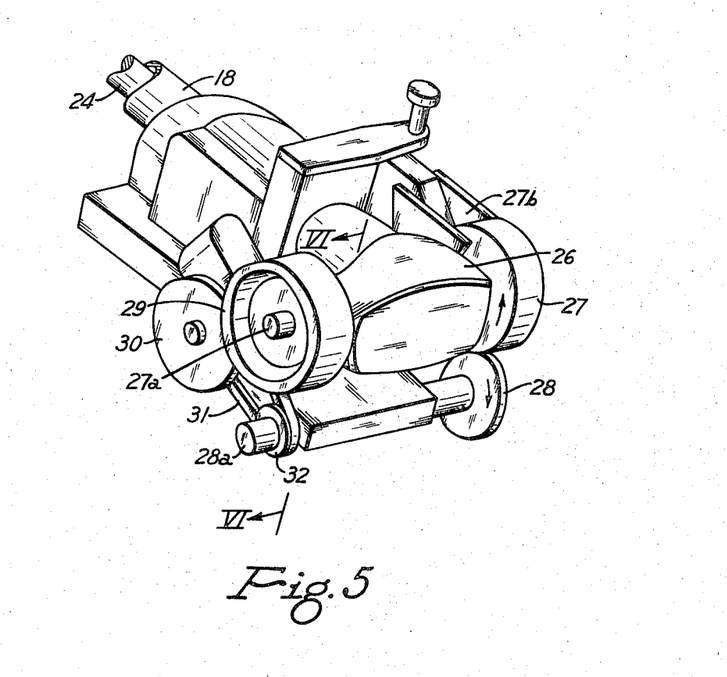
FIG. 5 is a perspective view of the stripe printing heads for a preferred embodiment of my invention.
Figure 6:
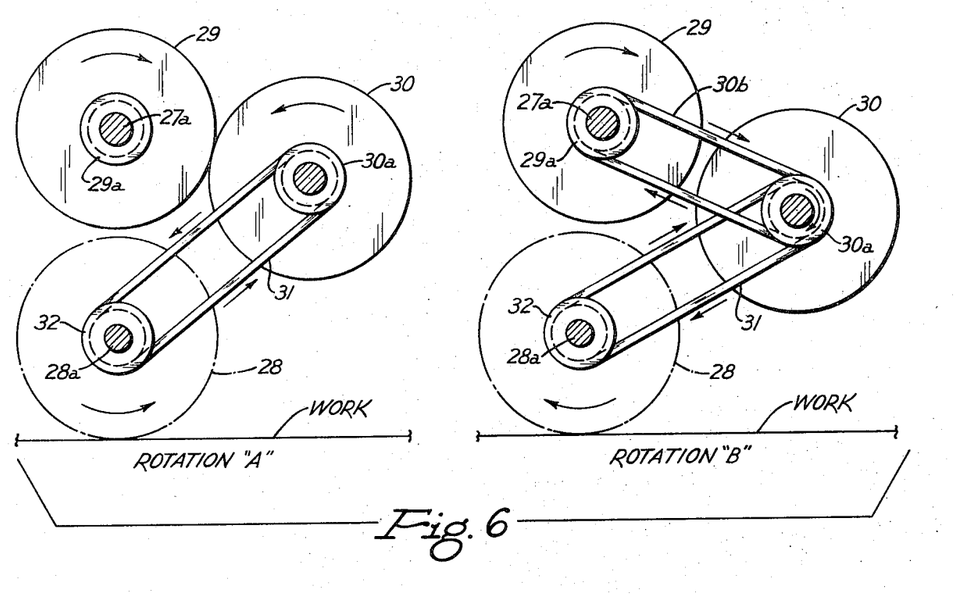
FIG. 6 is a section at the plane VI—VI in FIG. 5 showing the drive for the stripe printing roller providing two directions, selectively, of rotation, designated "Rotation A" and "Rotation B" in the figure.
Figure 6A:
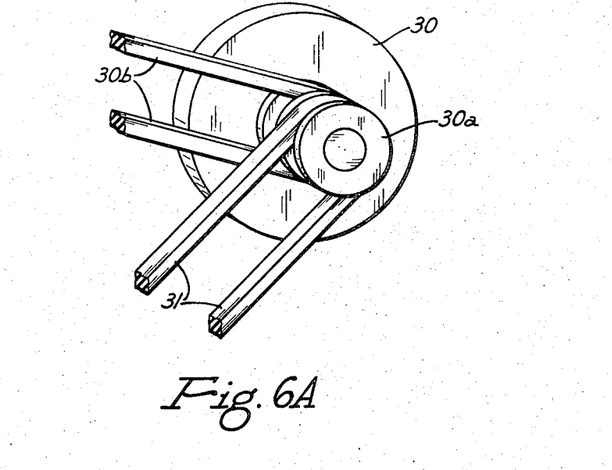
FIG. 6A is a perspective view of the retractable rubber drive roller from the opposite side shown in FIG. 6, illustrating the double pulley formed on the hub thereof.

The printing head 19 in the preferred embodiment of my new apparatus is similar to the hollow head 11, transverse shaft 12, drum 13 and roller 26 shown in FIGS. 3 and 4 of the Ryckman patent, but it includes improvements providing a positive drive for the stripe printing roller selectively in either direction. The drive shaft 24 extending into the housing 26 terminates in a bevel gear (not shown) corresponding to item 16 in the Ryckman patent, which meshes with another bevel gear (not shown) corresponding to Ryckman's gear 11, mounted on a transverse shaft 27a to one end of which the ink applicator drum is secured. In the preferred improved embodiment, however, shaft 27a extends through the housing on the opposite side on which extension is mounted a combination roller-pulley 29, the pulley portion of which is not apparent in FIG. 5 but is shown in FIG. 6. Adjacent the circumference of the drum portion of 29 a combination rubber-faced roller 30 on the hub of which is a double pulley portion 30a, shown in perspective in FIG. 6A. This roller 30 is adjustably mounted on the housing 26 such that its circumference may bear against the drum 29 (as shown in FIG. 5 and "Rotation A" in FIG. 6) or retracted therefrom (see "Rotation B" in FIG. 6). A belt 31 extends around one pulley of the double pulley 30a and a pulley 32 mounted on shaft 28a driving the stripe printing roller 28. When the rubber faced roller 30 and the drum 29 are in contact, the drum drives the roller-pulley 30 which in turn drives the printing roller 28 (shown in dot-dash line in FIG. 6) in "Rotation A," wherein the ink applicator drum 27 and printing roller 28 travel in the same direction and at the same speed at their point of contact. When the roller 30 is retracted from contact with drum 29, a second belt 30b is placed around pulley 29a and the other pulley of the double pulley 30a, as shown in "Rotation B," FIG. 6, rotating the printing roller in the opposite direction so as to produce a wiping action at the point of contact of the printing roller 28 and applicator drum 27. Such reversible drive for the printing roller with respect to the ink applicator drum as briefly described above is known and in commercial use in the stripe printing art, although it is not described in any patent known to me.

To the arm 18 adjacent the printing head 19 is secured a clamp 33 which projects upwardly a distance slightly above the elevation of templates 21 and 22 when the printing roller 28 is resting on a work piece at the stripe printing station 13. From the top of clamp 33 a bar 34 extends laterally towards the templates, on the end of which is journalled a vertical movement guide roller 35, rotatable about the horizontal axis of the bar 34. Adjacent the roller 35 there is secured to the bar 34 a vertically depending shaft or axle 36 on which is journalled a lateral movement guide roller 37, contacting the contoured edge of the horizontal template 21.

Figure 2:
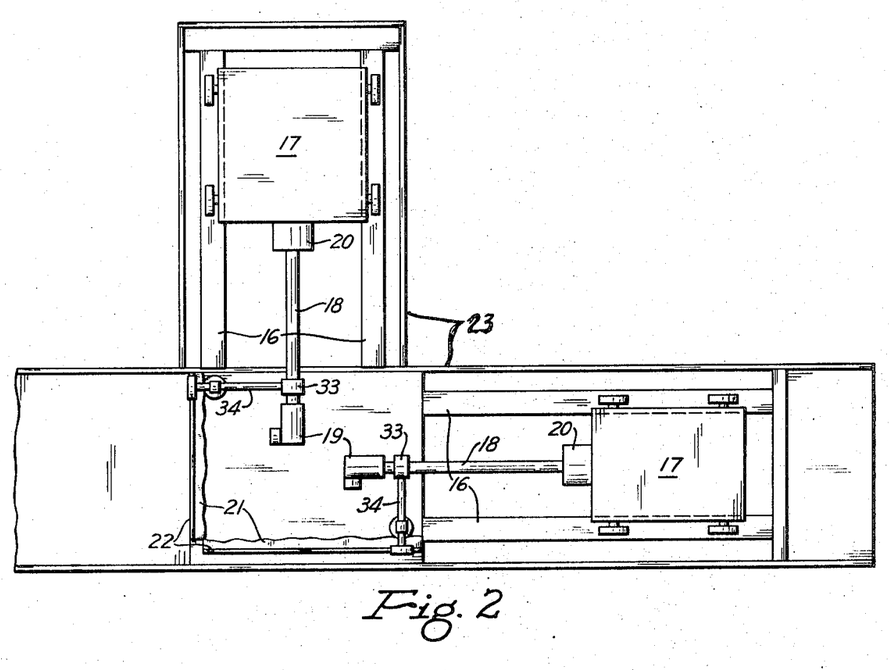
FIG. 2 is a plan view of the printing carriages and tracks therefor as embodied in the combination illustrated by FIG. 1.
Figures 7, 7A:
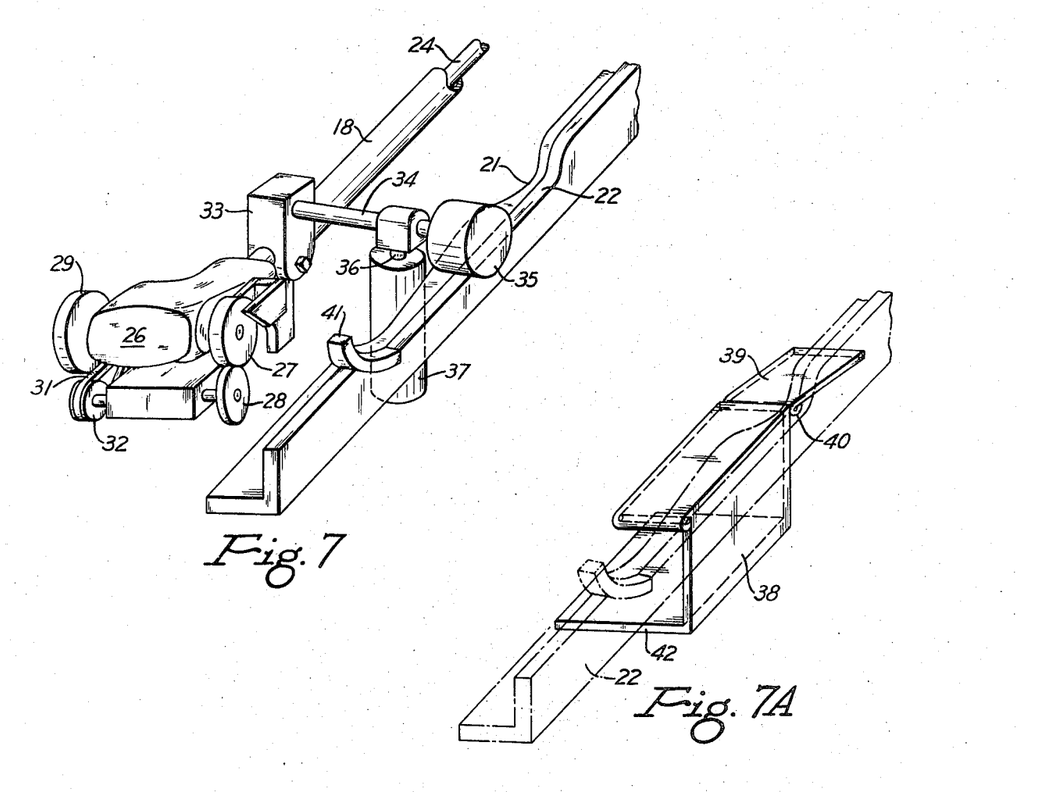
FIG. 7 is an isometric view of the printing head and templates guiding its vertical and horizontal traverse across the work.
FIG. 7A is an isometric view of a bypass track over the vertical template and FIG. 8 is a diagram illustrating the passage of the vertical guiding roller over the bypass track in one direction and the vertical template in the opposite direction.
Figure 8:
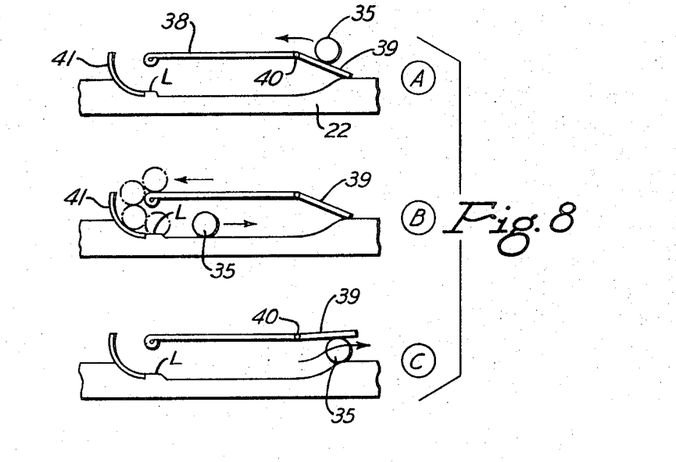

As will be explained in detail subsequently, the two carriages 17 are operated to traverse their respective tracks 16 back and forth, from retracted position as illustrated in FIGS. 1 and 2 to a pre-set position from which they return to retracted position. The printing heads thus cross the work station twice in each cycle, once on the forward travel of the carriages and again on the return travel. FIGS. 7, 7a and 8 illustrate how the vertical template is arranged to lower the printing head into contact with the work piece during travel of the carriage in one direction only. In the example shown, this is while the carriage is retracting from extreme forward position back to rest position. With the printing roller 28 rotating in "Rotation B" in FIG. 6, it will roll over the work piece. With the roller 28 rotating in "Rotation A" it will wipe the work piece as it travels thereover, if the printing is performed during the retraction of the printing head. The head supporting roller 35 then follows the vertical movement template 22 as shown in FIG. 7, which is low enough in the central trough to permit the printing roller to rest on the work. During forward movement of the roller, however, this roller rides over a template bypass track 38 shown in FIG. 7a, which may be bolted to the template but which has been removed in FIG. 7 to better display the lower track. At one end of the bypass track is a hinged flap 39 acting as a ramp to carry the roller over the top on the forward stroke, the hinged connection being item 40 in FIG. 7a. The bypass track terminates just ahead of the end of the lower template, and the roller drops around a transfer guide bar 41 to the lower template as the reverse motion of the carriage begins. As the roller approaches the end of the reverse travel, it rolls up a short incline lifting the printing head out of contact with the work piece and also raises the flap, which drops back into its ramp position when the roller has passed beyond its end.

As is clear from FIG. 8, the bypass track 38 must be a distance above the vertical template slightly greater than the diameter of the roller. There may be a short landing marked L in FIG. 8 just before the template track begins, to ease transfer without a bump on to the work piece. It is obvious that the hinged flap 39 may be at either end of the bypass track 38, the transfer guide bar 41 obviously being at the adjacent end of the vertical template 22, it being a matter of choice whether the stripe printing is performed on the forward or reverse travel of the carriage. Also, the bypass track may be secured to the template in any convenient manner; in the embodiment illustrated this is by means of a flange 42 extending horizontally below, and bolted or otherwise secured to, the template structure. The templates and bypass tracks are preferably bolted or otherwise easily removably fastened to the supporting frame, and stocked in sets each conforming to one of the several striping patterns used in striping a variety of sizes and shapes of work pieces.

The traverse of the carriages 17 back and forth is controlled by pairs of limit switches 43 and 44 respectively located in the path of the carriages at the limits predetermined for their traverse. Only one such pair is illustrated in FIG. 1, along the track 16 for the carriage 17 which moves parallel to the conveyor 10, but it is to be understood that a corresponding pair of limit switches is also provided for the other carriage 15 on its track 16 transverse to the conveyor 10. The limit switches 44 at the forward end of the travel of the carriages are preferably clamped or bolted to a longitudinal bar, not shown, such that they may be mounted in different positions each providing a traverse corresponding to any selected set of templates 21, 22. The limit switches 43 at the extreme retracted positions of the carriages may also be adjustable if desired but this is not essential, as the rest positions of the carriages may conveniently be the same for all sets of templates. The accompanying drawings do not include a wiring diagram for the control instrumentation, which would be conventional including reversing switches for the carriage drive motors, which are controlled by contacts in the limit switches. Limit switches 43 have a normally closed contact connected in series with the motor circuit, which is opened by return of the carriage to retracted position to stop the motor, and also a normally open contact which closes when the carriage is at rest, wired in series with the starting circuit for both the carriage motors and conveyor motor, conditioning start up of both on return of the carriages to rest position. Limit switch 44 is wired in the carriage motor control circuits to reverse the motors for carriages 17 at the forward end of the travel.

When two printing mechanisms 15 are provided, travelling at right angles to each other as illustrated in FIG. 2, the circuit also includes some means to start one carriage at a predetermined time after the other, such as a timer or another limit switch adjustably mounted between limit switches 43 and 44, to synchronize the travel of the second carriage in relation to the first to operate without interference where the printing heads cross paths in their right angle travel.

The printing mechanism controlled by templates comprises an independent sub-combination of my invention, operable on work pieces properly placed below it in indexed position. While it is preferred to provide a conveyor to deliver the work pieces to and remove them from such a printing station, it is obvious that the printing mechanism can be assembled above a stationary table on to which work objects may be loaded and unloaded by hand or any suitable mechanical devices. Such devices may be, for example, a mechanical stack unloader on one side of such table and a mechanical stacker on the opposite side of the table, the table having a roller surface to pass flat objects from one side to the other, in which combination the stack unloader is comparable to the feed end of conveyor 10 and the stacker on the opposite side of the roller surface table is comparable to the product delivery end of conveyor 10.

The work conveyor 10 will now be more particulary described. As shown in FIG. 1, at the loading station 11 a section of this conveyor is carried on an elastic support such as compression springs 45 to permit a slight vertical deflection when a work piece is placed thereon, and a microswitch 46 (or other suitable type of electrical contact) under this section is thereby operated, signalling the presence of a new work piece at the loading station 11. Microswitch 46 may be used simply to operate a signal light, buzzer, or other signal but preferably it is wired into the control circuit to provide automatic performance of a stripe printing cycle as will be explained subsequently.

Figures 9, 14:
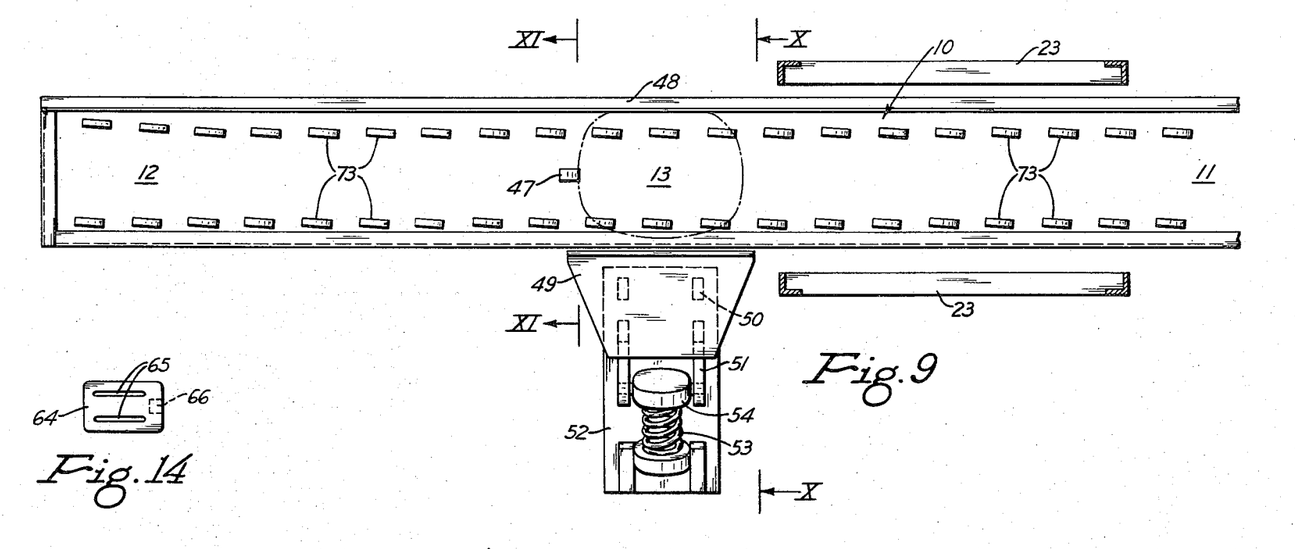
FIG. 9 is a plan view of the work conveyor below the carriage tracks and FIGS. 10 and 11 are transverse sectional views in elevation at the planes X—X and XI—XI of FIG. 9.
FIG. 14 is a plan view of the top of the limit switch support bracket shown in FIG. 13.
Figure 10:
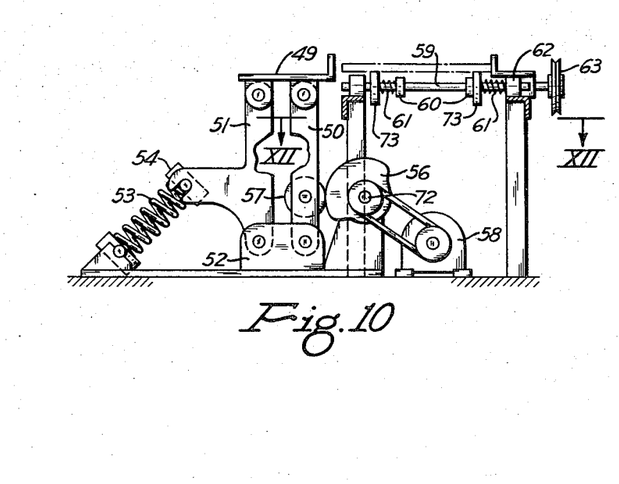
Figure 11:
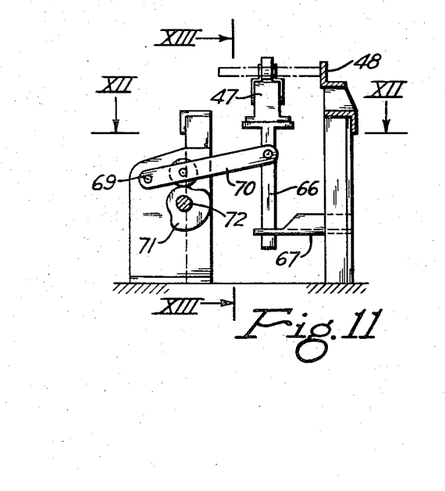

Referring now to FIGS. 9, 10 and 11, the rollers 73 are preferably inclined slightly to the longitudinal axis of the conveyor, and along one side of the conveyor 10, towards which the bias of the inclined rollers 73 tends to urge the work, is a guide rail 48, against which one edge of the work pieces carried by the conveyor slide. When the work piece arrives at the stripe printing station 13, it contacts a limit switch 47 connected into the control circuit to stop conveyor motor 14 and also to condition the starting of traverse of the printing carriages, as will be explained subsequently.

The limit switch 47 must be retracted to permit the work to pass on to the unloading station 12 after it is printed and it is also advisable to provide a pusher or indexing clamp to square up the work piece against the guide rail so as to be certain it is not askew. Also, the limit switch 47 is preferably adjustable lengthwise of the conveyor to accommodate a range of different size work pieces. A structure for this is shown in these figures.

On the side of the conveyor opposite the guide rail 48, an indexing clamp 49 is provided. This clamp 49 is the upper link of a hinged parallelogram so that it can move back and forth, substantially in a horizontal direction. The other links of the parallelogram are pairs of generally vertical bars 50 and 51 and a bracket 52 in the base supporting structure. The linkage is urged towards the conveyor by a spring 53 engaging a seat 54 pivoted between the pair of links 51, but held away (except when clamping is to be performed) by a cam 56 engaging a roller 57 pivoted between the links 50. This cam is rotated intermittently by a motor 58.

Referring to the conveyor roller shafts shown in FIG. 10, this particular construction is provided at the work station only. There the conveyor rollers 73 are slidably mounted on polygonal drive shafts 59 (e.g., a shaft of hexagonal cross section, the rollers having hexagonal holes in their hubs). The hubs of these rollers normally rest against collars 60 on the conveyor side opposite to the guide rail 48, being pushed towards these collars 60 by compression springs 61, the other ends of which bear against other collars secured to the shaft. Anti-friction bearings which hexagonal bore through the inner races are available, and the shaft is rotatably supported by such bearings 62 at opposite sides of the conveyor. This construction permits the rollers to slide towards the guide rail as the work piece resting on them is shifted laterally or twisted by the indexing clamp, so that the work piece does not have to slide on the rollers laterally and possibly be scratched thereby. The shaft 59 extends through a bearing 62 on one side where it is driven by a pulley or sprocket 53.

Figure 12:
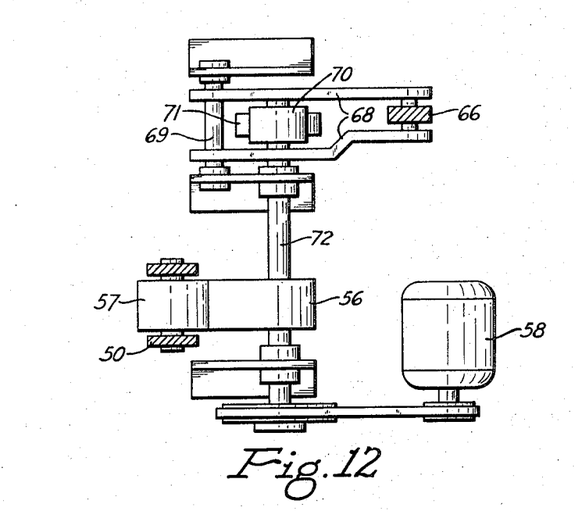
FIG. 12 is a partial section at the plane XII—XII in FIGS. 10 and 11.
Figure 13:
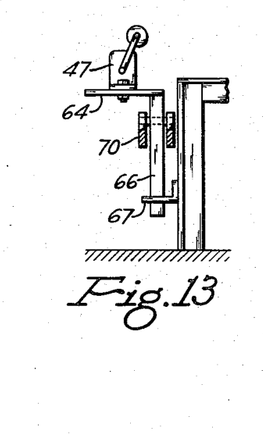
FIG. 13 is a partial cross section at the plane XIII—XIII in FIG. 11

Limit switch 47 is adjustably mounted upon a support bracket (FIG. 14) with adjustment slots 65, below the conveyor, which can be raised into contact position or lowered below the path of the work on the conveyor. This bracket is at the top of a vertical support bar 66, extending through a hole in a guide bracket 67 at the lower end and pivoted near its upper end to the end of a second class lever 68 (FIGS. 11, 12 and 13). Between the fulcrum 69 of the lever and the end connected to the limit switch support bar, a roller 70 is mounted resting against another cam 71 on the same cam shaft 72 as the clamp-controlling cam 56.

The limit switch bracket 64 is shown below the conveyor along its central axis at a point between two of the conveyor drive shafts, which are there spaced apart a distance sufficient for the limit switch 47 to be between the shafts within the range of adjustment provided by the slots 65. The assembly of the limit switch lifting mechanism below the conveyor is convenient but not necessary; the construction could be reversed, the limit switch being above the conveyor and retracted by raising it instead of lowering it as illustrated. This variation would be preferred in case a continuous belt conveyor, instead of a roller conveyor, were used.

Figure 15:
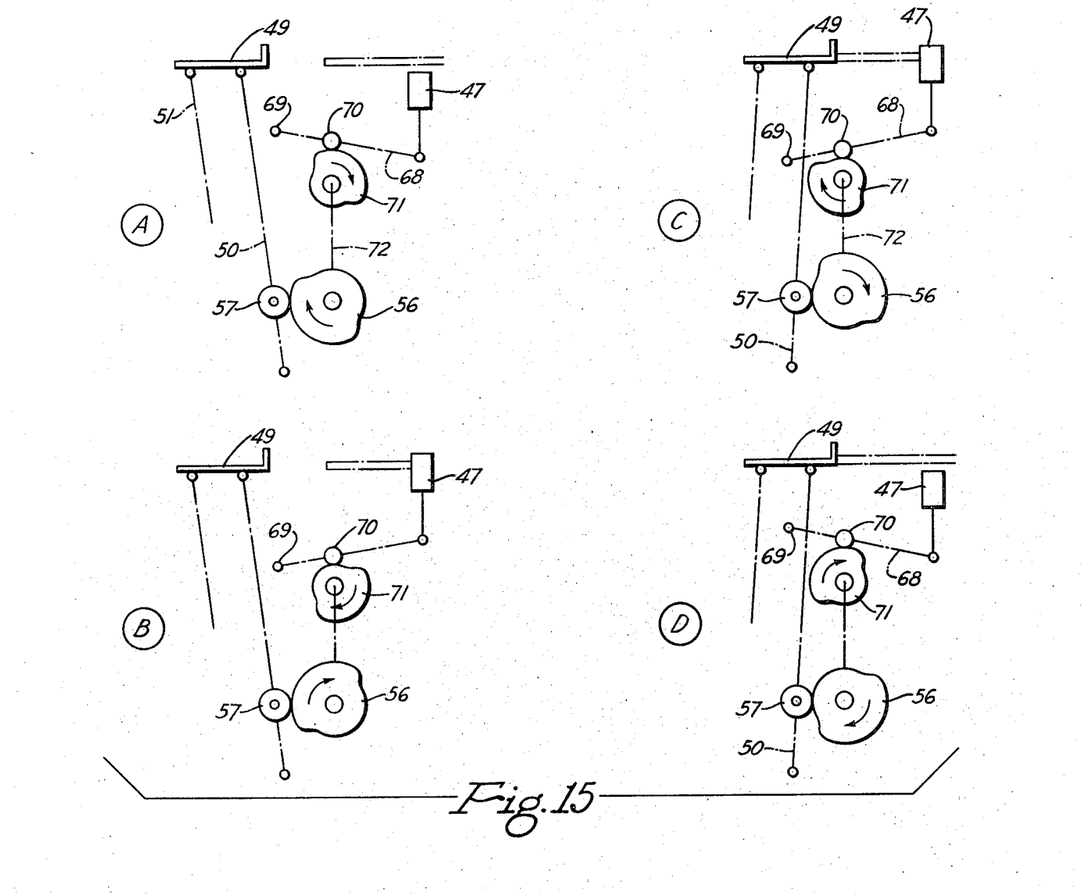
FIG. 15 is a diagram illustrating the various positions of the cams, work indexing limit switch and work positioning clamp shown in FIGS. 9, 10 and 11.

FIG. 15 diagrammatically illustrates the cam positions at successive 90° rotations of the cam shaft. In position A, the clamp 49 and limit switch 47 are both retracted, as when a finished work piece is to be removed to the unloading station. When the work station is cleared, the cam shaft is rotated 90° to position B, raising limit switch 47 to be contacted by a new work piece. When this occurs, limit switch 47 stops conveyor motor 14 and also starts motor 58 again, the cam shaft this time rotating 180° to position D, the work remaining clamped but limit switch 47 being retracted. The stripe printing carriages 15 then traverse the clamped work, printing the stripes according to patterns predetermined by the templates 21 and 22. As indicated diagrammatically in FIG. 1, a cam 74 is mounted on an extension of cam shaft 72 which, at position D of FIG. 15, contacts a limit switch 75 to stop the conveyor motor at this position, and to close a contact in the starting circuit through limit switches 43 conditioning the control circuit to again rotate the cam shaft 90° to position A, unclamping the work but retaining limit switch 47 below the work piece at the printing station so that it can pass on to the unloading station. This starting circuit is energized by the microswitch 46 at loading station 11, causing the conveyor to start and remove finished work pieces from the printing station 13 while a new work piece is carried towards the work station. This circuit includes a timer or time delay relay in the control circuit for cam motor 58, delaying the rotation of the cam shaft 90° from position A to position B in FIG. 15 sufficiently for the longest work piece to clear the printing station 13 and cause limit switch 47 to be raised before the new work piece arrives at printing station 13.

To summarize the operation of my system when an automatic control circuit is provded: assuming that a finished work piece is at work station 13, that a blank work piece is at the loading station 11 and that both carriages are retracted, microswitch 46 starts the conveyor 10, removing the finished work from the printing station 13 and simultaneously passing the blank work piece towards the printing station. Limit switch 47 remains retracted until the work station is unloaded, the rotation of cam shaft 72 from position A to position B being sufficiently delayed by a timer for such unloading. Limit switch 47 is then raised to position B while the blank work piece approaches the printing station, to stop the blank work piece there and also to energize the cam shaft motor 58 causing a blank work to be clamped in correct indexed position against the guide rail 48. The contacting of limit switch 47 by a blank work piece also starts the carriages to move in their forward direction while the work piece is being clamped, the clamping operation being rapid and short enough to permit this. On the reverse travel of the carriages across the work, initiated by limit switches 44, the printing heads are lowered by vertical templates 22 so that the stripe printing rollers 28 rest on the work piece and print the patterns predetermined by the contour of the templates 21 and 22. The cycle terminates when the carriages arrive at retracted rest position, the control circuit being broken by contacts in limit switches 43.

This operating cycle may be performed automatically by electrical instrumentation controlled by the switches illustrated and described, or it may be semi-automatic or under manual control as may be desired. The cycle provides printing the greatest number of work blanks in succession during a given production time. Thus, the printing station is unloaded while a blank work piece is being delivered to it; the blank work piece is clamped while the carriages are moving forwardly in non-printing traverse, and the motion of the two carriages at right angles is synchronized to provide the most rapid performance of the stripe printing operations without interference between the paths of travel of the printing heads.

The foregoing disclosure illustrates and describes a preferred embodiment of my stripe printing system, but my invention is not limited thereto but is more broadly set forth in the following claims.

I claim:

1. Apparatus for printing stripes on relatively flat work pieces comprising a sheet moving device, a printing station intermediate the ends of said device, means for stopping said device as each work piece thereon arrives at said printing station, at least one stripe printing mechanism mounted on a track above said printing station to traverse back and forth across each work piece at rest at said printing station, said printing mechanism including a pigment applying head at least vertically movable with respect to said track and said work pieces, template means guiding said pigment applying head as said printing mechanism traverses the printing station, the template means guiding said head vertically including means for supporting said printing head in raised position out of contact with said work piece in one direction of said traverse and means for lowering said printing head into contact with the work pieces in the opposite direction of said traverse, means for detecting and signalling the arrival of a blank work piece at said printing station, said signalling automatically stopping said sheet moving device, means controlling the traverse of the printing mechanism across said work blank interlocked with said signalling means to permit said traverse only when the blank is at the printing station and the device is at rest, means for detecting and signalling the completion of traverse of said printing mechanism, and second mentioned means for signalling interlocked with the controls for said device to permit said device to operate only when said printing mechanism is at rest.

2. Apparatus for printing stripes on relatively flat work pieces comprising a sheet moving device, a printing station intermediate the ends of said device, means for stopping said device as each work piece thereon arrives at said printing station, a pair of stripe printing mechanisms mounted on tracks above said printing station to traverse back and forth across each work piece at rest at said printing station, one printing mechanism of said pair being mounted on a track parallel to said sheet moving device and the other of said pair being mounted on a track transverse to said device, said printing mechanisms including pigment applying heads vertically and horizontally movable with respect to said track and said work pieces, template means guiding said pigment applying heads of each printing mechanism of said pair vertically and horizontally as said printing mechanisms traverse the printing station, the template means guiding said head vertically including means for supporting said printing heads in raised position out of contact with said work piece in one direction of said transverse and means for lowering said printing heads into contact with the work pieces in the opposite direction of said traverse, and means coordinating the traverses of both printing heads of said pair across the work blank at the printing station without collision.

3. Apparatus for printing stripe patterns on relatively flat work pieces comprising:
a sheet supporting said moving device,
a printing station intermediate the ends of said device,
means for stopping said device as each work piece supported thereon arrives at said printing station,
a track above said printing station,
at least one stripe printing mechanism mounted on said track to traverse back and forth across each work piece at rest at said printing station,
said printing mechanism including
a carriage component and
a pigment applying head component at least vertically movable with respect to said carriage component into and out of printing contact with said work piece at rest at said printing station,
means for reciprocating said carriage along said track from, and back to, a rest position beyond said printing station to cause said printing head to traverse back and forth above said work piece,
template means guiding said pigment applying head vertically and horizontally as said printing head traverses said work piece,
said template means guiding said head vertically including
means for supporting said printing head component in raised position out of contact with said work piece in one direction of traverse, and
means for lowering said printing head component into printing contact with said work piece in the opposite direction of said traverse.

4. The apparatus of claim 3 further characterized by means for indexing each work piece arriving at said work station in predetermined position with respect to said template means.

5. Apparatus for printing stripe patterns on relatively flat work pieces comprising:
a roller conveyor for supporting and moving said work pieces,
a printing station intermediate the ends of said conveyor,
means for stopping said conveyor as each work piece supported thereon arrives at said printing station,
a track above said printing station,
at least one stripe printing mechanism mounted on said track to traverse back and forth across each work piece at rest at said printing station;
said printing mechanism including
a carriage component and
a pigment applying head component at least vertically movable with respect to said carriage component into and out of printing contact with said work piece at rest at said printing station;
means for reciprocating said carriage along said track from, and back to, a rest position beyond said printing station to cause said printing head to traverse back and forth above said work piece;
template means guiding said pigment applying head vertically and horizontally as said printing head traverses said work piece,
said template means guiding said head vertically including means for lowering said printing head component into printing contact with said work piece in the opposite direction of said traverse;
means for indexing each work piece arriving at said printing station in predetermined position with respect to said template means comprising
a guide rail on one side of said conveyor;
a work indexing pusher on the opposite side of said conveyor at said work station, and
means actuating said pusher to bear against a side of a work piece and shift is laterally until the opposite side bears against said guide rail,
the rollers at said work station being slideably mounted for lateral resilient movement towards said guide rail while supporting the work piece as it is shifted by said pusher.

6. Apparatus for printing stripes on the surface of relatively flat work pieces comprising
a generally horizontal work support;
at least one stripe printing mechanism movably mounted above said work support and being bodily mounted rectilinearly back and forth traversing said work support, said mechanism including
a printing head and
a universal pivotal connection of said head in said mechanism providing vertical and horizontal pivotal deflection of said printing head with respect to said mechanism;
template means guiding the vertical pivotal deflection of said head as said mechanism moves to lower and raise said head into and from printing contact with work pieces on said support, and
template means guiding the horizontal pivotal deflection of said head to print predetermined stripe patterns when said head has been lowered by the first mentioned template means; means to start said stripe printing mechanism moving in one direction, means to reverse the motion of said mechanism, and means to stop said mechanism on its return to initial position.

7. In apparatus as set forth in claim 6, template bypass means raising said printing head and rendering said template guiding the vertical pivotal deflection inoperative during one direction of travel of said mechanism.

* * * * *